United States Patent
Baba

(10) Patent No.: US 9,537,715 B2
(45) Date of Patent: Jan. 3, 2017

(54) MANAGEMENT SYSTEM AND MONITORING APPARATUS

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 287 days.

(21) Appl. No.: 14/487,604

(22) Filed: Sep. 16, 2014

(65) Prior Publication Data

US 2015/0081891 A1 Mar. 19, 2015

(30) Foreign Application Priority Data

Sep. 18, 2013 (JP) ................................ 2013-193039

(51) Int. Cl.

| G06F 15/16 | (2006.01) |
|---|---|
| H04L 12/24 | (2006.01) |
| G06F 21/10 | (2013.01) |
| H04L 29/06 | (2006.01) |
| H04L 12/26 | (2006.01) |

(52) U.S. Cl.
CPC ......... *H04L 41/0853* (2013.01); *G06F 21/105* (2013.01); *H04L 29/06* (2013.01); *H04L 41/082* (2013.01); *H04L 43/50* (2013.01)

(58) Field of Classification Search
CPC .. H04L 29/06; H04L 29/08072; H04L 67/104; G06F 21/105
USPC ......... 709/203, 220, 224, 227, 232; 707/770
See application file for complete search history.

(56) References Cited

U.S. PATENT DOCUMENTS

| 7,647,407 B2* | 1/2010 | Omshehe .......... G06F 17/30873 709/219 |
|---|---|---|
| 8,015,299 B2* | 9/2011 | Omshehe .......... G06F 17/30873 709/217 |
| 9,396,206 B2* | 7/2016 | Lacapra ............ G06F 17/30206 |
| 2003/0231621 A1* | 12/2003 | Gubbi .................. H04B 17/382 370/352 |
| 2008/0288405 A1* | 11/2008 | John ..................... G06Q 20/40 705/44 |
| 2010/0228865 A1* | 9/2010 | Omshehe .......... G06F 17/30873 709/227 |
| 2013/0013619 A1* | 1/2013 | Lacapra ............ G06F 17/30206 707/747 |

(Continued)

FOREIGN PATENT DOCUMENTS

JP 2004-221799 A 8/2004

*Primary Examiner* — Khanh Dinh

(74) *Attorney, Agent, or Firm* — Canon USA, Inc. I.P. Division

(57) ABSTRACT

A management system including a network device provided in a customer environment, a monitoring apparatus, and a management server provided outside the customer environment is provided. When it is determined that an agreement has been obtained from a customer based on a customer status contained in status information acquired from the management server, the monitoring apparatus acquires setting information necessary for a monitoring operation from the management server to start the monitoring operation according to other content contained in the acquired status information. In one or more embodiments, the monitoring apparatus acquires the setting information only when it is determined that the agreement has been obtained from the customer.

16 Claims, 12 Drawing Sheets

(56) References Cited

U.S. PATENT DOCUMENTS

2013/0013654 A1\* 1/2013 Lacapra ............ G06F 17/30206
 707/822

\* cited by examiner

FIG. 7

DO YOU USE PROXY SERVER? ☑

PROXY SERVER ADDRESS :

PORT NUMBER :

DO YOU PERFORM USER AUTHENTICATION? ☑

USER NAME :

PASSWORD :

CONNECT

| STATUS ITEM | VALUE |
|---|---|
| MANAGEMENT TARGET UPDATE INFORMATION | UPDATE VERSION NUMBER |
| MONITORING APPARATUS UPDATE INFORMATION | UPDATE VERSION NUMBER |
| ⋮ | ⋮ |
| AGREEMENT STATUS INFORMATION | AGREED : 1 NOT AGREED : 0 |

| | 1001 |
|---|---|
| JOB LOG TRANSMISSION TIME | 09:00/17:00/01:00 |
| COUNTER TRANSMISSION TIME | 10:00/22:00 |
| MANAGEMENT TARGET DEVICE LIST | DEVICE A (IP/MAC ADDRESS, DEVICE NAME, DEVICE ID)<br>DEVICE B (IP/MAC ADDRESS, DEVICE NAME, DEVICE ID)<br>... |
| LIST OF SERVICES TO BE PROVIDED | 0: JOB LOG<br>1: COUNTER<br>2: ERROR HISTORY |
| ... | ... |

MANAGEMENT SYSTEM AND MONITORING APPARATUS

BACKGROUND OF THE INVENTION

Field of the Invention

The present invention relates to a technique for collecting various kinds of operation information of network devices including an image forming apparatus (such as a printer or a copying machine) on a network, and managing the information.

Description of the Related Art

Conventionally, management systems for collecting operation information such as the number of printed sheets, job logs, and status information from image forming apparatuses to be managed such as copying machines, and managing the operating status of the image forming apparatuses have been provided.

For example, Japanese Patent Application Laid-Open No. 2004-221799 discusses a technique in starting management of an image forming apparatus. Specifically, first, a communication test is performed between an image forming apparatus to be managed and a monitoring apparatus at the same location as the image forming apparatus, and between the monitoring apparatus and a remotely located central management server, respectively. After the communication test succeeds, the monitoring apparatus starts acquisition of data from the image forming apparatus, and transmission of the acquired data to the central management server.

Under present circumstances, in a customer network environment in which network devices including an image forming apparatus to be managed are provided, information about the network devices and the information about the customer needs to be handled with the greatest care. In recent years, security requirements for such information have become important especially in the field of the network device management.

As disclosed in Japanese Patent Application Laid-Open No. 2004-221799, when the installation of the monitoring apparatus in the customer network and the communication test have been successfully completed, the management of the operation information by the central management server can be started immediately. At the administrator's side, to immediately start the device management on the agreed start date after the customer agrees to a contract about various services of the device management, an operation for preparation such as installation of the monitoring apparatus in the customer network needs to be performed without waiting for the agreement.

However, in some cases, even though various services of the device management are ready to start, the customer may not have agreed to the contract with the administrator's side due to, for example, review of the contents and start date of the services, or the internal approval process of the services on the customer's side.

SUMMARY OF THE INVENTION

The present invention(s) are directed to: (i) a system enabling a monitoring apparatus to smoothly start various device management services at the time when an agreement has been obtained from a customer while preventing the monitoring apparatus from acquiring data from a management target and transmitting the acquired data to a management server before obtaining the agreement; (ii) a monitoring apparatus; (iii) methods for controlling such a system and monitoring apparatus; and (iv) a computer-readable storage medium storing a program that causes a computer to execute a method for controlling a monitoring apparatus.

According to an aspect of the present invention(s), a management system including a network device provided in a customer environment, a monitoring apparatus, and a management server provided outside the customer environment, methods for controlling same, and a computer-readable medium storing a program that causes a computer to execute a method for controlling a monitoring apparatus are provided. The monitoring apparatus includes a first request unit configured to issue a first request for acquiring status information to the management server according to a predetermined schedule, a determination unit configured to determine, based on a customer status contained in the status information acquired as a response to the first request, whether an agreement has been obtained from a customer, a second request unit configured to, if it is determined that the agreement has been obtained from the customer, issue a second request for acquiring setting information necessary for a monitoring operation to the management server according to other content contained in the acquired status information, a holding unit configured to store the setting information acquired as a response to the second request in a storage unit included in the monitoring apparatus, and a monitoring unit configured to start the monitoring operation according to the stored setting information. The management server includes a setting unit configured to perform a setting for indicating that the agreement with the customer has been confirmed, an updating unit configured to, according to the setting performed by the setting unit, update the customer status indicating whether the agreement has been obtained from the customer, a first response unit configured to respond to the first request with the status information containing the customer status, and a second response unit configured to respond to the second request with the setting information necessary for the monitoring operation.

Further features of the present invention will become apparent from the following description of exemplary embodiments with reference to the attached drawings.

BRIEF DESCRIPTION OF THE DRAWINGS

FIG. 7 illustrates an example of a screen for inputting connection information.

FIG. 8 illustrate an example of status information (interface (I/F) information) containing an agreement status.

FIG. 10 illustrates an example of setting information to be used by the monitoring apparatus.

DESCRIPTION OF THE EMBODIMENTS

Various exemplary embodiments, features, and aspects of the invention will be described in detail below with reference to the drawings.

Figure 1:
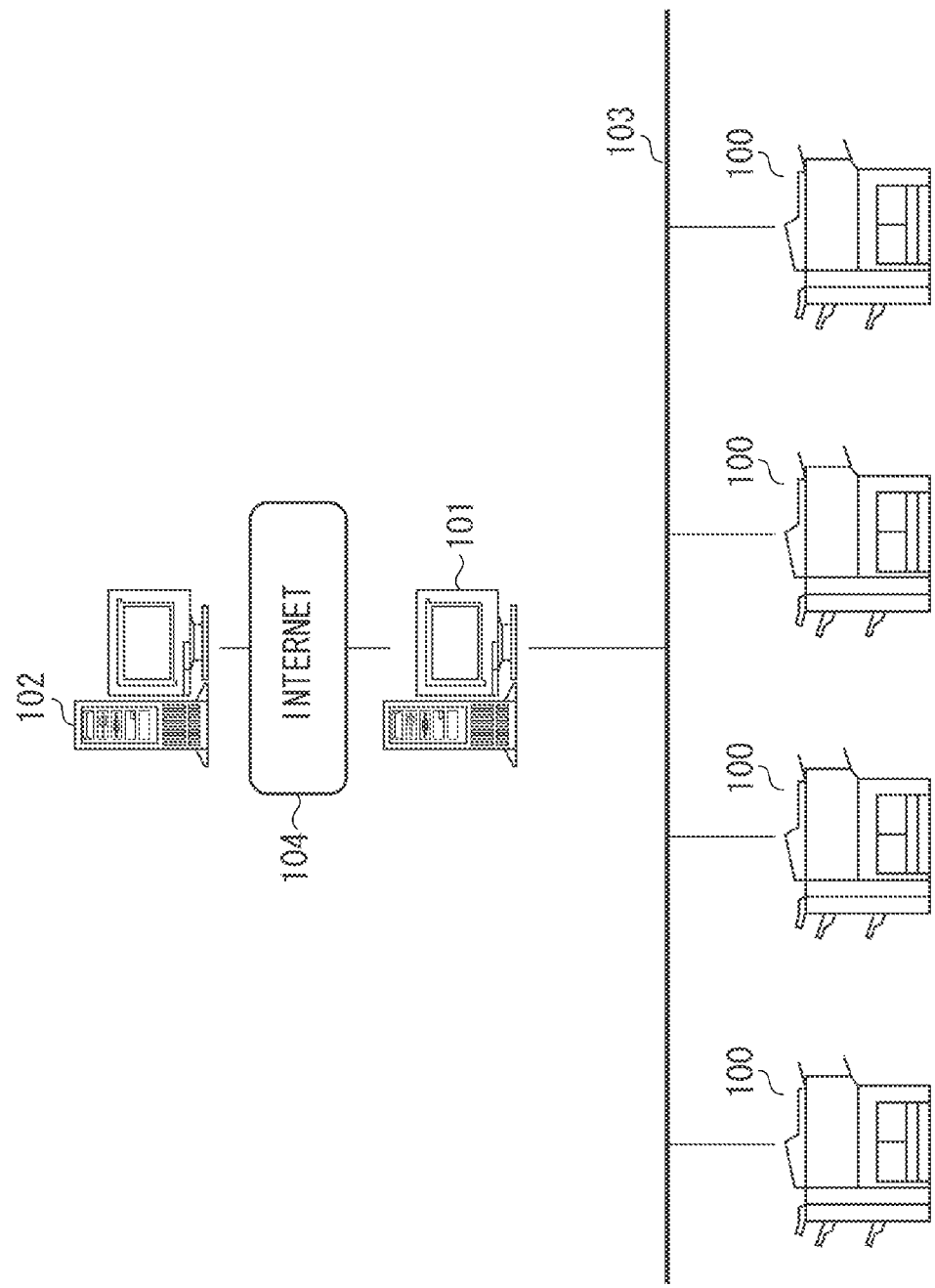
FIG. 1 illustrates an overview of a system according to an exemplary embodiment of the present invention.

FIG. 1 illustrates an example of a network configuration of a management system according to a first exemplary embodiment of the present invention. In the example of the configuration illustrated in FIG. 1, network devices 100 include an image forming apparatus such as a printer or a copying machine.

A monitoring apparatus 101 monitors an operating status of the network devices 100 and acquires operation information such as counter information, status information, and log information from the network devices 100. A management server 102 collects various kinds of information transmitted from the monitoring apparatus 101 and manages the information.

In FIG. 1, the management server 102 is provided in a network environment distant from a network environment (local area network (LAN)) 103 including the network devices 100. Specifically, the environment including the network devices 100 and the monitoring apparatus 101 is connected with the environment including the management server 102 via Internet 104. Between the monitoring apparatus 101 and the management server 102, a firewall (not illustrated) may be provided.

In an exemplary embodiment of the present invention, the monitoring apparatus 101 can be configured to be connected to the network devices 100 via the Internet 104. Further, the monitoring apparatus 101 and the management server 102 can be configured to be connected to each other through an intranet via a LAN without using the Internet 104.

The network environment including the network devices 100 and the monitoring apparatus 101 connected via the LAN 103 is a network environment of a customer using the network devices 100, and in an exemplary embodiment of the present invention, the network environment is called a customer environment. The management server 102 collects operation information of the devices to be managed among a plurality of the network devices 100 provided in the customer environment via the monitoring apparatus 101 so that various services for managing the devices are remotely implemented. The various services for managing the devices include, for example, a service for reporting the use status of the network devices 100, a maintenance service such as automatic arrangement of a service staff for the maintenance of the network devices 100, and an order service of consumable goods for the network devices 100.

In an exemplary embodiment of the present invention, the network devices 100 can be, other than the above-described image forming apparatuses, various devices such as cameras, home appliances, and automatic-teller machines that can be connected to a network.

Figure 2:
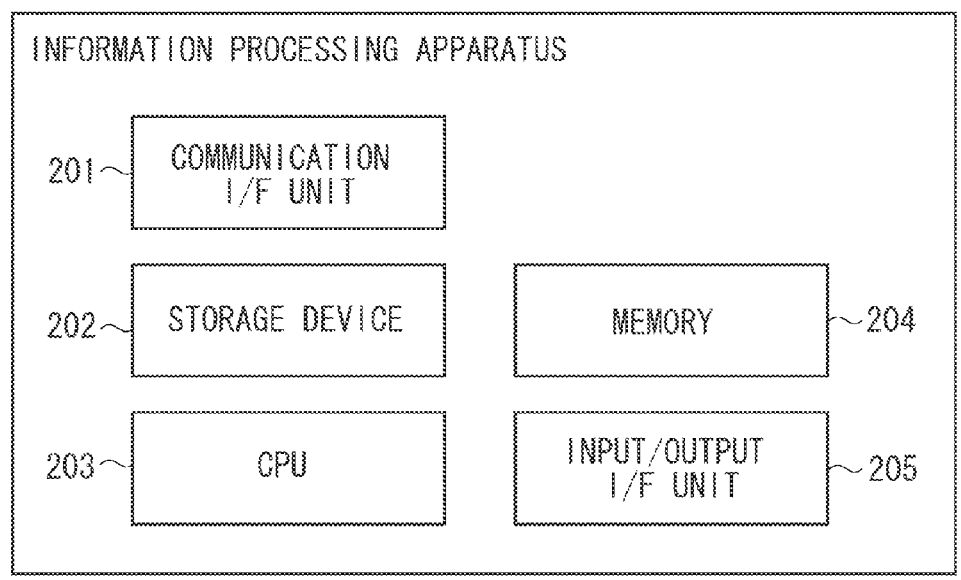
FIG. 2 illustrates an example of a hardware configuration of an information processing apparatus according to an exemplary embodiment of the present invention.

FIG. 2 illustrates an example of a hardware configuration included in an information processing apparatus operable as the monitoring apparatus 101 or the management server 102. The information processing apparatus includes a communication I/F unit 201, a storage device 202, a central processing unit (CPU) 203, a memory 204, and an input/output I/F unit 205. An information processing apparatus having a configuration other than the above-described configuration can be applied to an exemplary embodiment of the present invention.

The communication I/F unit 201 is a network interface to be used for connection with an external network. For example, in the monitoring apparatus 101, the communication I/F unit 201 is an interface to communicate with the management server 102 and the network devices 100 via various networks. The storage device 202 stores programs such as an operating system (OS) therein. For example, in the monitoring apparatus 101, the storage device 202 stores a control program for implementing the monitoring operation to be described below, and an installer for installing the program therein. The CPU 203 loads a program from the storage device 202 into a memory 204, and executes the program. The input/output I/F unit 205 connects an output device such as a display to output a result of execution of a program or to receive an input of an operation from a user as necessary.

Figure 3:
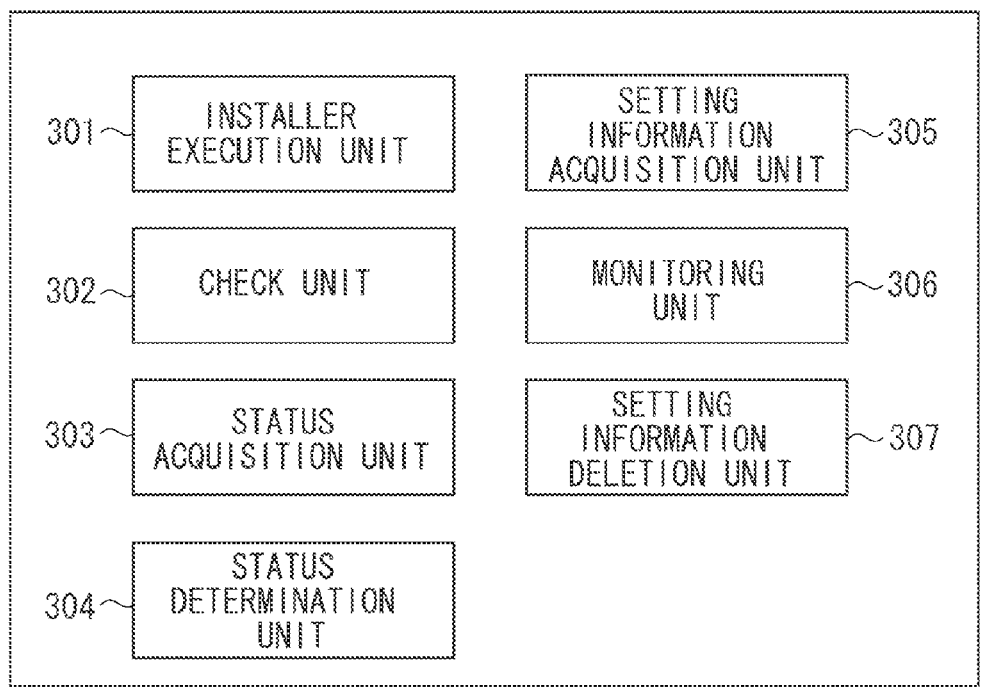
FIG. 3 illustrates an example of a module configuration of software in a monitoring apparatus according to an exemplary embodiment of the present invention.

FIG. 3 illustrates an example of a module configuration of software in the monitoring apparatus 101. This example particularly represents the module configuration according to an exemplary embodiment of the present invention.

An installer execution unit 301 controls the installation of a control program according to an exemplary embodiment of the present invention when an installer acquired via the input/output I/F unit 205 in advance is executed according to an instruction from a user. The installed control program is executed according to the control of the installation so that processing by units 302 to 307 to be described below is implemented.

A check unit 302 performs a communication test to the management server 102 to check whether communication connection via the communication I/F unit 201 and the network can be made. Further, at this point, based on various kinds of information (for example, proxy information) input by the user via the input/output I/F unit 205, the connection is made.

A status acquisition unit 303 transmits a request for various kinds of information to the management server 102 and acquires a response to the request via the communication I/F unit 201. The request is executed at execution timing (periodic time intervals) preset in the status acquisition unit 303. The execution timing can be changed according to an instruction from the management server 102. The response from the management server 102 includes, as the status information managed by the management server 102, a status for determining whether an agreement about starting the services has been obtained from the customer. A status determination unit 304 analyzes the response acquired by the status acquisition unit 303, checks the agreement status, and determines whether there is a change in the other status information.

When the status determination unit 304 determines that the agreement has been obtained, a setting information acquisition unit 305 transmits a request for setting information necessary to start an operation to provide the services to the management server 102 and acquires the information therefrom via the communication I/F unit 201. The acquired setting information is then stored in the storage device 202.

A monitoring unit 306 acquires, from the network devices 100 via the communication I/F unit 201, identification information for identifying the devices, configuration information indicating device configurations (such as functions), and operation information (such as counter information, log information, and a status). The monitoring unit 306 transmits a request to the network device 100, or acquires the above information based on transmission from the network device 100. Further, the monitoring unit 306 transmits the acquired information to the management server 102. The monitoring unit 306 also performs other operations necessary to monitor the network devices 100.

A setting information deletion unit 307 is a function necessary to implement another exemplary embodiment to be described below, and is not always necessary to implement the present exemplary embodiment. Thus, in the present exemplary embodiment, a description of the setting information deletion unit 307 is omitted.

Figure 4:
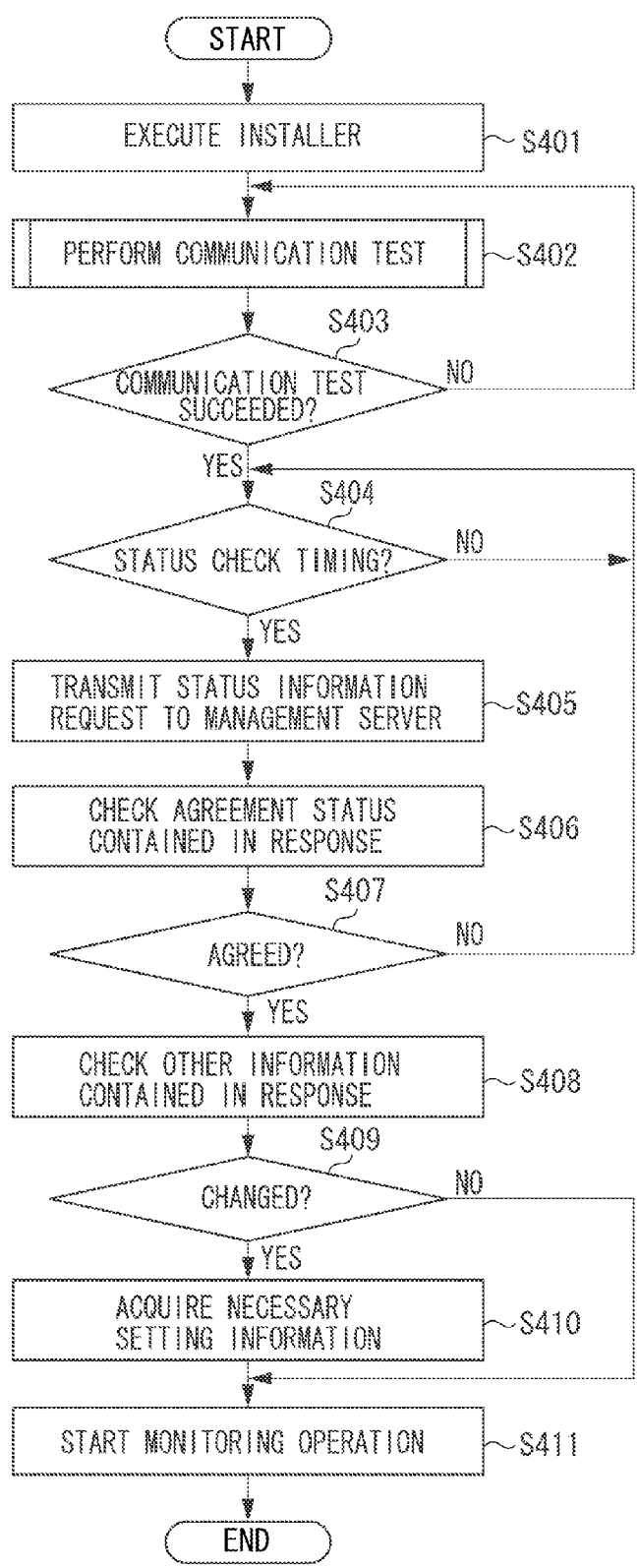
FIG. 4 is a flowchart illustrating an example of processing performed by the monitoring apparatus to start a monitoring operation.

FIG. 4 is a flowchart illustrating an example of processing performed by the monitoring apparatus 101 to start a monitoring operation of the network devices 100 to implement device management services provided by the management server 102. The monitoring operation includes processing necessary to provide the device management services, for example, identifying the network devices 100 to be managed, setting communication timing, acquiring various kinds of information from the network devices 100, and transmitting the acquired information to the management server 102.

In step S401, the monitoring apparatus 101 receives an input of an instruction for executing the installer from a user. The installer is started in response to the input, and the installer execution unit 301 starts controlling the installation processing.

Herein, a configuration of the installer will be described with reference to FIG. 5.

In an installation module 501, a module set necessary for the operation of the monitoring apparatus 101 is provided. Specifically, modules (for example, the units 302 to 307 illustrated in FIG. 3) including a function of acquiring information from the network devices 100, and functions of performing various kinds of determination processing in the monitoring apparatus 101 to be described below are provided. By the control of the installation processing by the installer execution unit 301, the units 302 to 307 illustrated in FIG. 3 are installed in the monitoring apparatus 101. Various data files 502 contain various kinds of data necessary to start the services. Customer identification information 503 contained in the various data files 502 includes information such as information for uniquely identifying a customer, and the name of the customer. Monitoring apparatus identification information 504 contains information such as information for uniquely identifying the monitoring apparatus 101, and the name of the monitoring apparatus 101.

Figure 5:
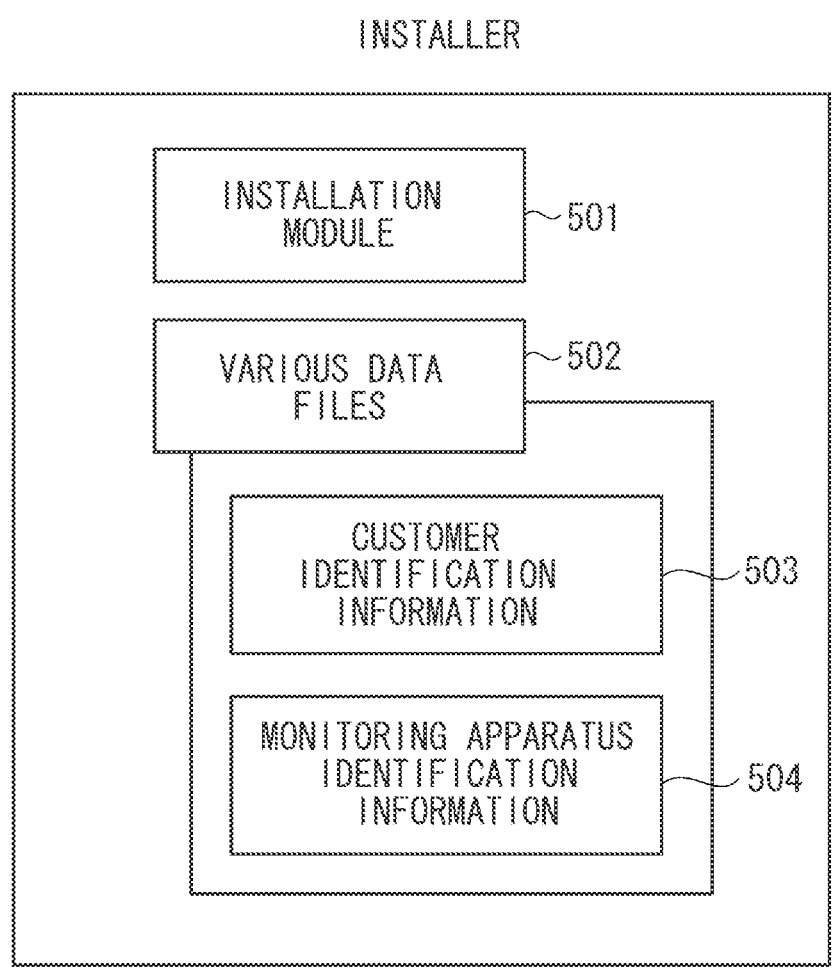
FIG. 5 illustrates an example of a configuration of an installer.

The installer illustrated in FIG. 5 is generated by the management server 102 in advance as a file containing the above-described contents. The installer is stored, by using a portable storage medium or an electronic mail, in an information processing apparatus to be operated as the monitoring apparatus 101 by an administrator in the customer environment.

Returning to the description of FIG. 4, in step S402, the check unit 302 performs a communication test to the management server 102 via the communication I/F 201. Herein, processing for performing the communication test will be described in detail with reference to FIG. 6.

Figure 6:
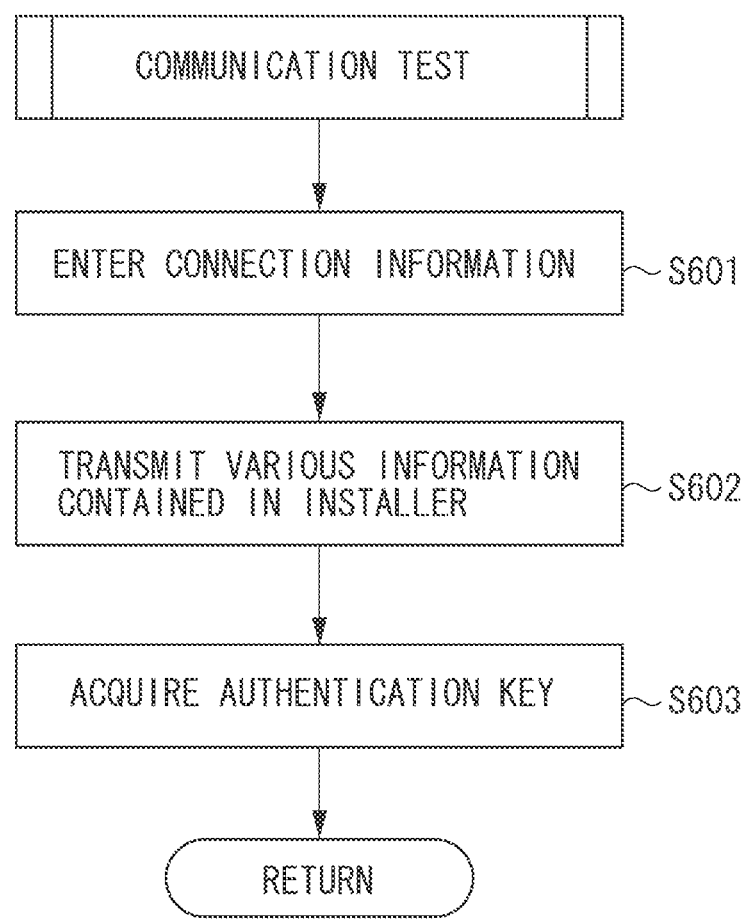
FIG. 6 is a flowchart illustrating an example of processing for performing a communication test to a management server by the monitoring apparatus.

FIG. 6 is a flowchart illustrating the processing for performing the communication test to the management server 102 by the monitoring apparatus 101.

In step S601, the check unit 302 stores, in the storage device 202, connection information necessary for connection with the management server 102 that is input by a user via a user interface (UI) screen of the monitoring apparatus 101. The connection information is, for example, proxy setting information relating to the customer network.

With reference to FIG. 7, an example of a screen on which the user enters the information for connecting the monitoring apparatus 101 and the management server 102 will be described below.

On a connection information input screen 701, a check box "DO YOU USE PROXY SERVER?" for entering whether to use a proxy server is provided. When the check box is enabled (the proxy server is to be used), a proxy server address and a port number can be entered. On the connection information input screen 701, a check box (DO YOU PERFORM USER AUTHENTICATION?) for entering whether to perform user authentication is also provided. When the check box is enabled (the user authentication is to be performed), a user name and a password can be entered. When the user presses a "CONNECT" button via the connection information input screen 701, the check unit 302 starts the connection using the input information.

In step S602, the check unit 302 performs a communication test to the management server 102 based on the connection information entered in the processing in step S601. Specifically, the monitoring apparatus 101 connects to the management server 102 provided at a location distant from the customer network including the monitoring apparatus 101, and conducts a test to check whether communication can be surely performed. To perform the communication test, the check unit 302 transmits the customer identification information 503 and the monitoring apparatus identification information 504 included in the installer illustrated in FIG. 5.

In step S603, the check unit 302 acquires an authentication key from the management server 102 as a response to the request from the monitoring apparatus 101 in the communication test. The authentication key is used in the subsequent communication to ensure secure communication between the management server 102 and the monitoring apparatus 101.

The management server 102 checks, based on each identification information transmitted in the processing in step S602, whether the monitoring apparatus 101 in which the installer has been executed is operating in an appropriate customer environment. In the management server 102, the various kinds of information used in generating the installer have already been registered. By the above-described communication test, the management server 102 can recognize that, for example, the monitoring apparatus 101 is the first monitoring apparatus in which the authorized installer having the information corresponding to the registered information has been executed. Then, when the management server 102 determines that the monitoring apparatus 101 has been appropriately provided in the customer environment, the management server 102 transmits a response including the authentication key to the monitoring apparatus 102.

Returning to the description of FIG. 4, in step S403, the check unit 302 determines whether the communication test to the management server 102 has succeeded. If the check unit 302 determines that the communication test has succeeded (YES in step S403), the processing proceeds to step S404, and if the check unit 302 determines that the communication test has failed (NO in step S403), the processing returns to step S402.

In step S404, the status acquisition unit 303 determines whether the timing for executing a status check to the management server 102 has come. The timing has already been set in the status acquisition unit 303 since the execution of the installation by the above-described installer. If the status acquisition unit 303 determines that the status check timing has come (YES in step S404), the processing proceeds to step S405. If the status acquisition unit 303 determines that the status check timing has not come (NO in step S404), the processing returns to step S404.

In step S405, the status acquisition unit 303 transmits a request for the status information to the management server 102. A response to the request includes various statuses relating to the services to be provided by the management server 102 to the customer. The status acquisition unit 303 then acquires the status information as the response from the management server 102, and stores the information in the storage device 202. The acquired status information includes an agreement status relating to the start of the services for the customer.

With reference to FIG. 8, an example of the status information (I/F information) containing the agreement status will be described below.

Status information 801 acquired by the status acquisition unit 393 as the response from the management server 102 contains, for example, update information of a management target, update information of the monitoring apparatus 101, and agreement status information.

The update information of the management target is information for detecting whether the information of the network devices 100 to be managed has been updated. The monitoring apparatus 101 refers to the information to detect addition or deletion of a management target. At the management server 102 side, each time the addition or deletion of a management target occurs, the update version number is incremented by one.

The monitoring apparatus update information is information for detecting whether identification information of or an attribute of the monitoring apparatus 101 has been updated. The monitoring apparatus 101 refers to the information to detect update of the information (for example, name change) of the monitoring apparatus 101. At the management server 102 side, each time the information of the monitoring apparatus 101 is updated, the update version number is incremented by one.

The agreement status information contains information for detecting whether an agreement about the start of the services has been obtained from the customer. At the management server 102 side, when the agreement has been obtained from the customer, the agreement status information is set to "1", and when the agreement has not been obtained from the customer, the agreement status information is set to "0".

In this example, the status information (I/F information) for detecting a change in the various kinds of information is defined, and the status information includes the agreement status information. This is merely an example, and within the scope where the object of the present invention can be achieved, the configuration and definition method of the I/F information, the information to be contained in the I/F information can be freely defined.

Returning to the description of FIG. 4, in step S406, based on the acquired status information, the status determination unit 304 checks the contents of the agreement status information. In step S407, the status determination unit 304 determines whether the agreement has been obtained from the customer. If the status determination unit 304 determines that the agreement has been obtained from the customer (YES in step S407), the processing proceeds to step S408. If the status determination unit 304 determines that the agreement has not been obtained from the customer (NO in step S407), the processing returns to step S404. If the status determination unit 304 determines that the agreement has not been obtained from the customer, the status determination unit 304 omits the analysis of the other statuses contained in the above-described status information.

Figure 9:
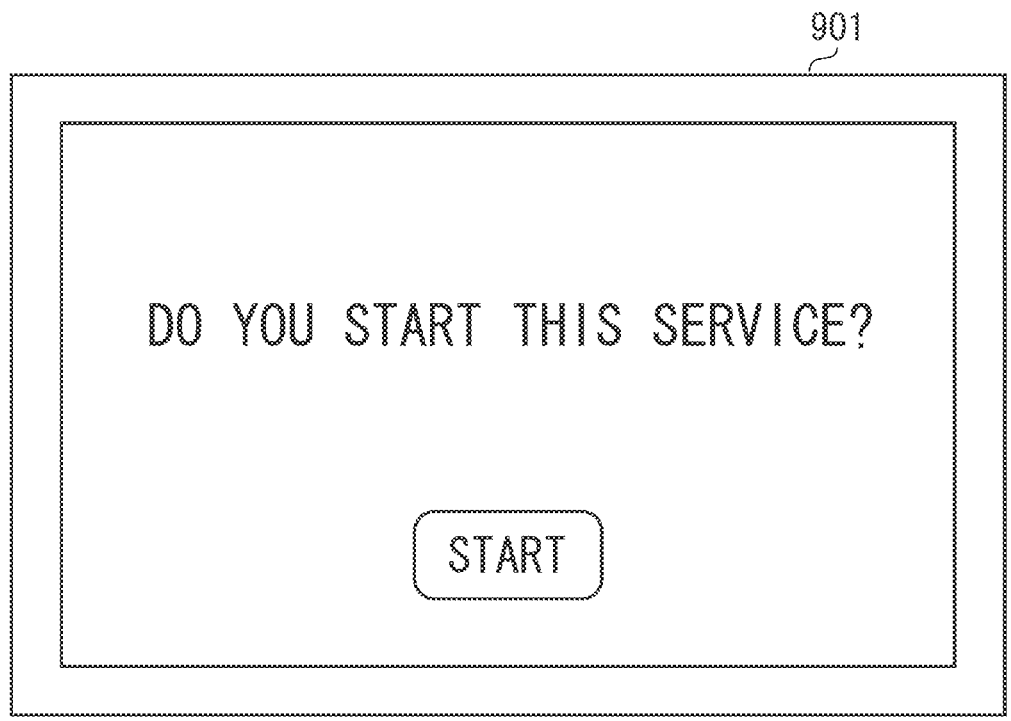
FIG. 9 illustrates an example of a screen for setting a customer agreement status relating to start of service.

The setting of the customer agreement status is performed via a UI screen provided by the management server 102 by the operator running the services when the operator receives contact from the customer. With reference to FIG. 9, a screen for setting the customer agreement status provided by the management server 102 will be described below.

A setting screen 901 is configured as a screen for issuing an instruction to start the services provided by the management server 102. When the operator presses a "START" button, the value of the agreement status information contained in the status information to be transmitted as a response to the monitoring apparatus 101 is set to "1".

Returning to the description of FIG. 4, in step S408, the status determination unit 304 analyzes and checks the contents other than the agreement status information contained in the status information. In step S409, the status determination unit 304 compares the value of each item other than the acquired agreement status information with the value of the item that has been stored in the storage device 202. If the status determination unit 304 determines that there is a change in the information (YES in step S409), the processing proceeds to step S410. If the status determination unit 304 determines that there is no change in the information (NO in step S409), the processing proceeds to step S411.

In the present exemplary embodiment, the management server 102 manages the update of the various statuses using the update version numbers as illustrated in FIG. 8. The monitoring apparatus 101 compares the update version numbers stored in the storage device 202 with the update version numbers acquired by the analysis in step S408 to determine whether there is a change.

When the installer is executed, the installer execution unit 301 stores, in the storage device 202, an initial value (for example, "0") of each item contained in the status information. In the processing in step S409 immediately after checking the agreement status, the first status information determination processing is performed after the agreement has been obtained from the customer, and consequently, generally, values other than the initial values are set by the management server 102, and the monitoring apparatus 101 determines that there is a change in the information. However, prior to obtaining the customer agreement and generating the installer, if information about the network devices 100 to be managed or information about the monitoring apparatus 101 has been fixed, the processing in step S410 to be described below can be omitted by including the above information in the installer.

In step S410, the setting information acquisition unit 305 transmits, to the management server 102, a request for the various kinds of setting information necessary for the operation, and acquires the information. The acquired setting information is stored in the storage device 202.

For example, in the processing in step S409, if it is determined that there is a change in the management target update information, the monitoring apparatus 101 transmits to the management server 102 a request for the device information about the network devices 100 to be managed. The device information includes identification information for identifying management targets and the types of service to be provided to each of the management targets. If it is determined that there is a change in the monitoring apparatus update information, the monitoring apparatus 101 transmits to the management server 102 a request for information to be set in the monitoring apparatus 101. Other than that, for example, the monitoring apparatus 101 transmits a request for information such as a transmission schedule for transmitting the various types of data acquired from the management targets to the management server 102. The setting information acquired by transmitting the requests is stored in the storage device 202, and is used in the monitoring operation by the monitoring unit 306.

With reference to FIG. 10, an example of setting information 1001 stored in the storage device 202 will be described below.

First, a transmission schedule for each type of the operation information acquired from the management targets is managed. In this example, the time for performing the transmission in a day has been set. According to the transmission time, the monitoring apparatus 101 transmits the data to the management server 102. Further, a list of the network devices 100 to be managed is also managed. In the list, information such as an IP/MAC address, a device name, and a device ID of each device is managed. The types of service to be provided to the management targets are also managed in the list. In this example, an integer is assigned to each service type for management, and operation information necessary to provide each service is to be collected from the network devices 100 to be managed.

Association of each of the network devices 100 to be managed with the types of service to be applied thereto can be managed as the setting information. In such a case, different operation information is to be acquired from each of the network devices 100 included in the management target device list.

Returning to FIG. 4, in step S410, the monitoring unit 306 starts the monitoring operation according to the setting information stored in the storage device 202.

As described above, the status information acquired in the processing in step S405 in FIG. 4 includes information other than the agreement status. A request for the status information from the status acquisition unit 303 is to be regularly performed in the subsequent processing even after the monitoring apparatus 101 starts the monitoring operation. In such a case, the request is performed not to check the agreement status of the customer, but to check and edit the conditions and settings for the monitoring operation. In the present exemplary embodiment, until the agreement with the customer is confirmed, the request is performed only to check the agreement status. Consequently, in step S407, if it is confirmed that the agreement with the customer does not exist, all of the processing relating to the other statuses in the acquired status information is omitted. However, other than the customer status, if there is a status relating to processing to be performed before starting the services, the processing for checking the status can be performed in a similar manner to the processing in steps S405 to S407.

In the above-described first exemplary embodiment, the operation to be performed when a state in which an agreement has not been obtained from a customer is changed to a state in which the agreement has been obtained from the customer has been described. However, there may a case in which after the monitoring apparatus 101 has started the monitoring operation, the operator desires to temporarily stop the services on the management server 102 side due to occurrence of some problem. In such a case, it is assumed that the operation at the monitoring apparatus 101 side also needs to be stopped simultaneously with stopping the services.

A second exemplary embodiment is basically similar to the first exemplary embodiment, and only the difference will be described below.

The setting information deletion unit 307 illustrated in FIG. 3 is a module for deleting various kinds of setting information necessary for the operation managed by the monitoring apparatus 101.

Figure 11:
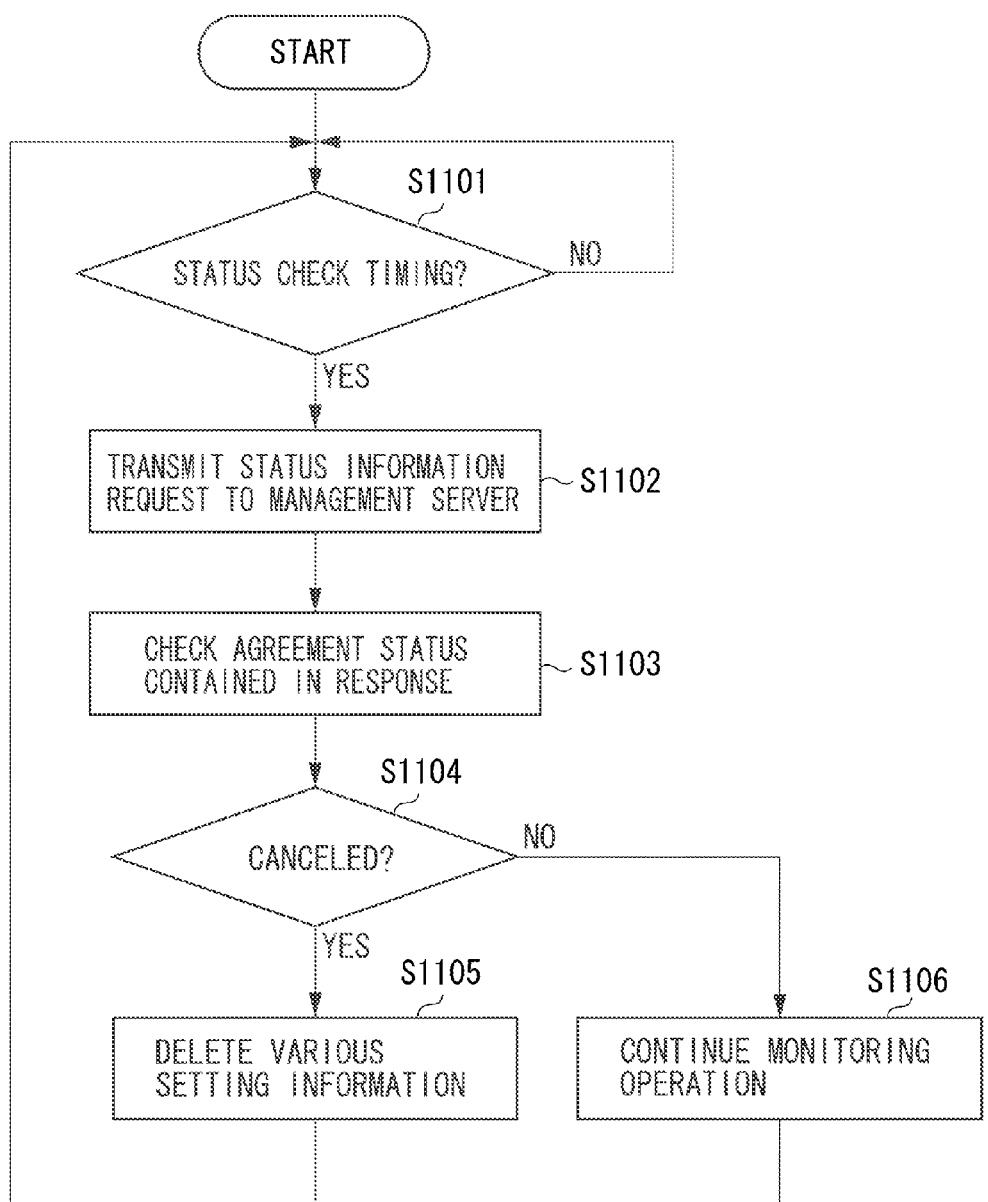
FIG. 11 is a flowchart illustrating processing for stopping the monitoring operation by the monitoring apparatus according to a second exemplary embodiment.

FIG. 11 is a flowchart illustrating processing performed by the monitoring apparatus 101 to stop the monitoring operation.

In step S1101, the status acquisition unit 303 determines whether the timing for executing the status check to the management server 102 has come. If the status acquisition unit 303 determines that the check timing has come (YES in step S1101), the processing proceeds to step S1102. If the status acquisition unit 303 determines that the check timing has not come (NO in step S1101), the processing returns to step S1101.

In step S1102, the status acquisition unit 303 transmits a request for the status information to the management server 102. A response to the request includes various statuses relating to the services provided by the management server 102 to the customer. The status acquisition unit 303 acquires the status information as the response from the management server 102, and stores the information in the storage device 202. The acquired status information includes, similarly to the first exemplary embodiment, an agreement status relating to the start of the services for the customer.

In step S1103, the status determination unit 304 analyzes the contents of the agreement status information contained in the status information, and checks the information. In step S1104, the status determination unit 304 determines whether the customer agreement has been canceled. If the status determination unit 304 determines that the customer agreement has been canceled (YES in step S1104), the processing proceeds to step S1105. If the status determination unit 304 determines that the customer agreement has not been canceled (NO in step S1104), the processing proceeds to step S1106.

Figure 12:
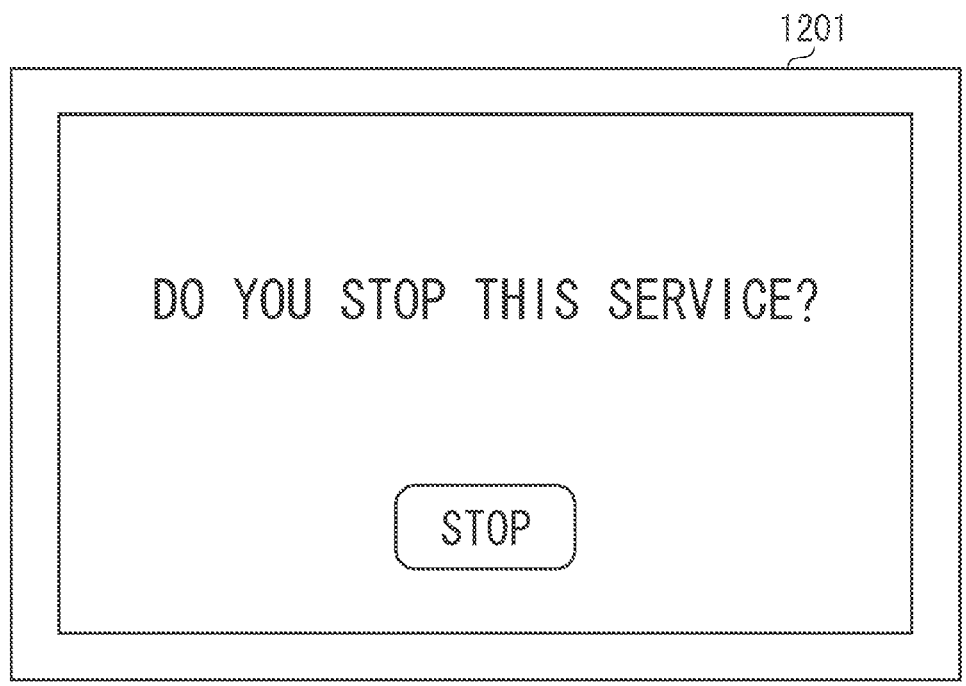
FIG. 12 illustrates an example of a screen for stopping the service.

The setting of the customer agreement status is performed via an UI screen (illustrated in FIG. 12) provided by the management server 102 when the operator performing the service operation receives contact from the customer or when the operator desires to temporarily stop the services. With reference to FIG. 12, a setting screen for stopping the services (canceling the customer agreement) will be described below.

A service stop screen 1201 is configured as a screen for issuing an instruction to stop the services provided by the management server 102. When the operator presses a "STOP" button, the value of the agreement status information contained in the status information to be transmitted as a response to the monitoring apparatus 101 is set to "0".

Returning to the description of FIG. 11, in step S1105, the setting information deletion unit 307 deletes the various types of setting information necessary for the monitoring operation from the storage device 202. The various kinds of setting information indicated in this processing include a device list indicating management targets, and an operation information transmission schedule. Deletion of such setting information stops the monitoring operation of the monitoring apparatus 101. However, the processing for requesting the status information containing the agreement status by the status acquisition unit 303 is regularly performed. The processing is performed to detect an instruction for starting the services again.

The deletion (uninstallation) of all modules according to an exemplary embodiment of the present invention including the status acquisition unit 303 stops the status request by the status acquisition unit 303.

In step S1106, the monitoring unit 306 continues the monitoring operation. If the other contents included in the status information acquired in step S1102 by the status acquisition unit 303 have been updated, the status acquisition unit 303 transmits a request for the corresponding setting information to the management server 102, and acquires the information. The acquired setting information is reflected to the subsequent monitoring operation.

As described above, when stop of the services is detected, the setting information necessary for the monitoring operation is deleted and the services can be appropriately stopped.

In the above-described first and second exemplary embodiments, differences among the provided services are not specifically described. However, the management server 102 can provide several services such as a counter information collection service, a job log collection service, and a software delivery service. When a customer has signed a contract for a plurality of services, processing similar to that in the first and second exemplary embodiments can be performed for each of the services. In such a case, an installer for the monitoring apparatus 101 can be provided for each of the services, or one installer including modules relating to the plurality of services can be provided and implemented.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193039 filed Sep. 18, 2013, which is hereby incorporated by reference herein in its entirety.

What is claimed is:

1. A management system comprising a network device provided in a customer environment, a monitoring apparatus, and a management server provided outside the customer environment, the monitoring apparatus comprising:

a first request unit configured to issue a first request for acquiring status information to the management server according to a predetermined schedule;

a determination unit configured to determine, based on a customer status contained in the status information acquired as a response to the first request, whether an agreement has been obtained from a customer;

a second request unit configured to, if it is determined that the agreement has been obtained from the customer, issue a second request for acquiring setting information necessary for a monitoring operation to the management server according to other content contained in the acquired status information;

a holding unit configured to store the setting information acquired as a response to the second request in a storage unit included in the monitoring apparatus; and a monitoring unit configured to start the monitoring operation according to the stored setting information, and the management server comprising:

a setting unit configured to perform a setting for indicating that the agreement with the customer has been confirmed;

an updating unit configured to, according to the setting performed by the setting unit, update the customer status indicating whether the agreement has been obtained from the customer;

a first response unit configured to respond to the first request with the status information containing the customer status; and a second response unit configured to respond to the second request with the setting information necessary for the monitoring operation, wherein the monitoring apparatus does not issue the second request using the second request unit, regardless of the other content contained in the acquired status information, if it is determined that the agreement has not been obtained from the customer.

2. The management system according to claim 1, wherein the first request unit issues the first request if a communication test has succeeded between the monitoring apparatus and the management server.

3. The management system according to claim 2, wherein, in the communication test, when the monitoring apparatus communicates with the management server and an installer for monitoring the network device is executed in the monitoring apparatus, identification information of the customer and identification information of the monitoring apparatus contained in the installer are transmitted to the management server, and as a result of determination processing by the management server based on the identification information of the customer and the identification information of the monitoring apparatus, if the monitoring apparatus receives information for authentication from the management server, the communication test succeeds.

4. The management system according to claim 1, further comprising:

a deletion unit configured to delete the setting information stored in the storage unit, after the monitoring operation is started, if the determination unit determines that the agreement has been cancelled based on the customer status contained in the status information acquired from the management server, wherein the monitoring unit stops the monitoring operation according to the deletion of the setting information.

5. The management system according to claim 4, wherein, even after the monitoring operation is stopped according to the deletion of the setting information, the first request unit issues the first request to the management server according to the predetermined schedule, and the determination unit determines whether the agreement has been obtained from the customer based on the customer status contained in the status information acquired as the response to the first request for evaluating whether to restart the monitoring operation.

6. The management system according to claim 1, wherein the setting information contains at least one of identification information of the network device to be managed, information relating to operation information to be acquired from the network device to be managed, and a transmission schedule for transmitting the operation information acquired from the network device to be managed to the management server.

7. The management system according to claim 6, wherein the monitoring unit executes, as the monitoring operation, acquiring the operation information from the network device, and transmitting the acquired operation information to the management server according to the transmission schedule.

8. The management system according to claim 1, wherein the agreement is obtained from the customer for each service provided by the management server.

9. A monitoring apparatus provided in a customer environment including a network device, the monitoring apparatus comprising:
  a first request unit configured to issue a first request for acquiring status information to a management server provided outside the customer environment according to a predetermined schedule;
  a determination unit configured to determine, based on a customer status contained in the status information acquired as a response to the first request, whether an agreement has been obtained from a customer;
  a second request unit configured to, if it is determined that the agreement has been obtained from the customer, issue a second request for acquiring setting information necessary for a monitoring operation to the management server according to other content contained in the acquired status information;
  a holding unit configured to store the setting information acquired as a response to the second request in a storage unit included in the monitoring apparatus; and
  a monitoring unit configured to execute the monitoring operation according to the stored setting information,
  wherein if it is determined that the agreement has not been obtained from the customer, the second request unit does not issue the second request, regardless of the other content contained in the acquired status information.

10. The monitoring apparatus according to claim 9, wherein the first request unit issues the first request if a communication test has succeeded between the monitoring apparatus and the management server.

11. The monitoring apparatus according to claim 10, wherein, in the communication test, when the monitoring apparatus communicates with the management server and an installer for monitoring the network device is executed in the monitoring apparatus, identification information of the customer and identification information of the monitoring apparatus contained in the installer are transmitted to the management server, and as a result of determination processing by the management server based on the identification information of the customer and the identification information of the monitoring apparatus, if the monitoring apparatus receives information for authentication from the management server, the communication test succeeds.

12. The monitoring apparatus according to claim 9, wherein the setting information contains at least one of identification information of the network device to be managed, information relating to operation information to be acquired from the network device to be managed, and a transmission schedule for transmitting the operation information acquired from the network device to be managed to the management server.

13. The monitoring apparatus according to claim 12, wherein the monitoring unit executes, as the monitoring operation, acquiring the operation information from the network device, and transmitting the acquired operation information to the management server according to the transmission schedule.

14. A method for controlling a management system comprising a network device provided in a customer environment, a monitoring apparatus, and a management server provided outside the customer environment,
  the method executed by the monitoring apparatus comprising:
  issuing a first request for acquiring status information to the management server according to a predetermined schedule;
  determining, based on a customer status contained in the status information acquired as a response to the first request, whether an agreement has been obtained from a customer;
  issuing a second request for acquiring setting information necessary for a monitoring operation to the management server according to other content contained in the acquired status information if it is determined that the agreement has been obtained from the customer;
  storing the setting information acquired as a response to the second request in a storage unit included in the monitoring apparatus; and
  starting the monitoring operation according to the stored setting information, and
  the method executed by the management server comprising:
  performing a setting for indicating that the agreement with the customer has been confirmed;
  updating the customer status indicating whether the agreement has been obtained from the customer according to the setting;
  responding to the first request with the status information containing the customer status; and
  responding to the second request with the setting information necessary for the monitoring operation,
  wherein if it is determined that the agreement has not been obtained from the customer, the second request is not issued, regardless of the other content contained in the acquired status information.

15. A method for controlling a monitoring apparatus provided in a customer environment including a network device, the method comprising:
  issuing a first request for acquiring status information to a management server provided outside the customer environment according to a predetermined schedule;
  determining, based on a customer status contained in the status information acquired as a response to the first request, whether an agreement has been obtained from a customer;

issuing a second request for acquiring setting information necessary for a monitoring operation to the management server according to other content contained in the acquired status information if it is determined that the agreement has been obtained from the customer;

storing the setting information acquired as a response to the second request in a storage unit included in the monitoring apparatus; and executing the monitoring operation according to the stored setting information, wherein if it is determined that the agreement has not been obtained from the customer, the second request is not issued, regardless of the other content contained in the acquired status information.

16. A non-transitory computer-readable storage medium storing a program that causes a computer to execute a method for controlling a monitoring apparatus provided in a customer environment including a network device, the method comprising:

issuing a first request for acquiring status information to a management server provided outside the customer environment according to a predetermined schedule;

determining, based on a customer status contained in the status information acquired as a response to the first request, whether an agreement has been obtained from a customer;

issuing a second request for acquiring setting information necessary for a monitoring operation to the management server according to other content contained in the acquired status information if it is determined that the agreement has been obtained from the customer;

storing the setting information acquired as a response to the second request in a storage unit included in the monitoring apparatus; and executing the monitoring operation according to the stored setting information, wherein if it is determined that the agreement has not been obtained from the customer, the second request is not issued, regardless of the other content contained in the acquired status information.

* * * * *